(12) United States Patent
Fabre et al.

(10) Patent No.: US 11,572,187 B2
(45) Date of Patent: Feb. 7, 2023

(54) PIVOTING CONNECTION DEVICE BETWEEN AT LEAST TWO COMPONENTS, AIRCRAFT COMPRISING A COWL PROVIDED WITH SAID PIVOTING CONNECTION DEVICE

(71) Applicant: Airbus Operations SAS, Toulouse (FR)

(72) Inventors: Christian Fabre, Tournefeuille (FR); Alain Bignolais, Leguevin (FR); Paolo Messina, Toulouse (FR); Thomas Bourdieu, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 936 days.

(21) Appl. No.: 16/415,380

(22) Filed: May 17, 2019

(65) Prior Publication Data
US 2019/0359344 A1 Nov. 28, 2019

(30) Foreign Application Priority Data
May 22, 2018 (FR) ...................................... 1854214

(51) Int. Cl.
*B64D 29/06* (2006.01)
*F16C 11/04* (2006.01)
*F16C 11/02* (2006.01)

(52) U.S. Cl.
CPC .............. *B64D 29/06* (2013.01); *F16C 11/02* (2013.01); *F16C 11/045* (2013.01); *F16C 2326/43* (2013.01)

(58) Field of Classification Search
None
See application file for complete search history.

(56) References Cited

U.S. PATENT DOCUMENTS

| 1,120,367 A | * | 12/1914 | Booraem et al. | ..... F16B 13/068 |
| | | | | 384/271 |
| 1,943,364 A | * | 1/1934 | Betz | ........................... F16J 1/16 |
| | | | | 403/34 |

(Continued)

FOREIGN PATENT DOCUMENTS

| FR | 2947592 A1 | 1/2011 |
| FR | 3014972 A1 | 6/2015 |

OTHER PUBLICATIONS

French Search Report; priority document.

*Primary Examiner* — Kayla Mccaffrey
(74) *Attorney, Agent, or Firm* — Greer, Burns & Crain, Ltd.

(57) ABSTRACT

A pivoting connection device connecting at least two components and comprising an end fitting having first and second branches, an arm positioned between the first and second branches of the end fitting, a cylindrical axle connecting the end fitting and the arm and having, at one of the ends thereof, a first portion configured to expand radially, a cylindrical rod configured to be screwed into a tapped portion of the cylindrical axle, an insert fitted on the cylindrical rod and movable between a first position, in which the first portion is not expanded, and a second position, in which the first portion is expanded radially, and a nut configured to be screwed on the cylindrical rod to urge the insert into the second position.

10 Claims, 3 Drawing Sheets

(56) References Cited

U.S. PATENT DOCUMENTS

| | | | |
|---|---|---|---|
| 5,320,443 A * | 6/1994 | Lien | F16C 11/02 403/334 |
| 8,657,543 B2 | 2/2014 | Fabre et al. | |
| 2007/0172328 A1 | 7/2007 | Houck et al. | |
| 2015/0167726 A1 | 6/2015 | Cassagne et al. | |

* cited by examiner

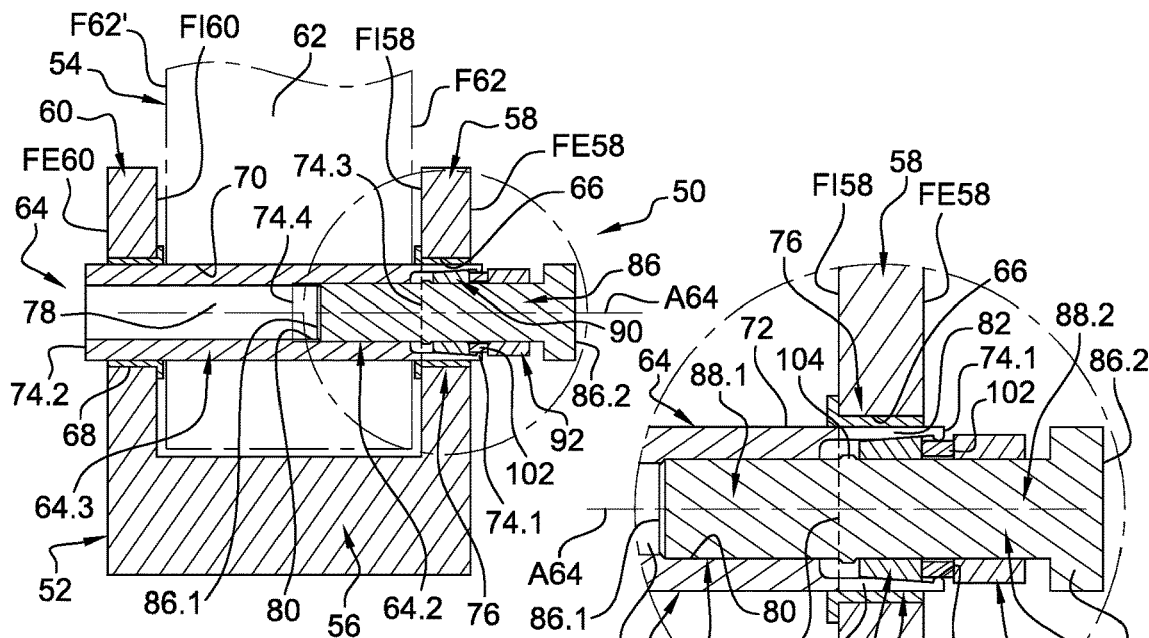
Fig. 7
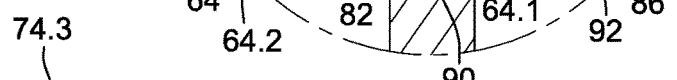
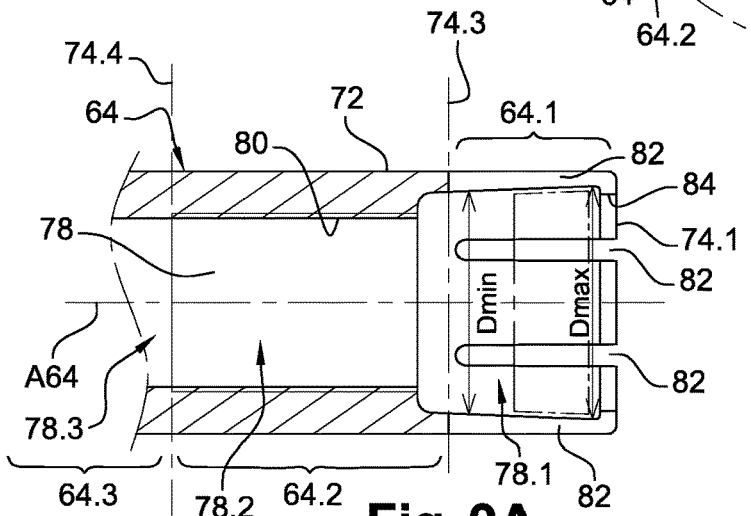
Fig. 9A
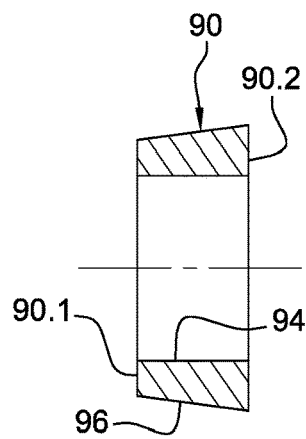
Fig. 10
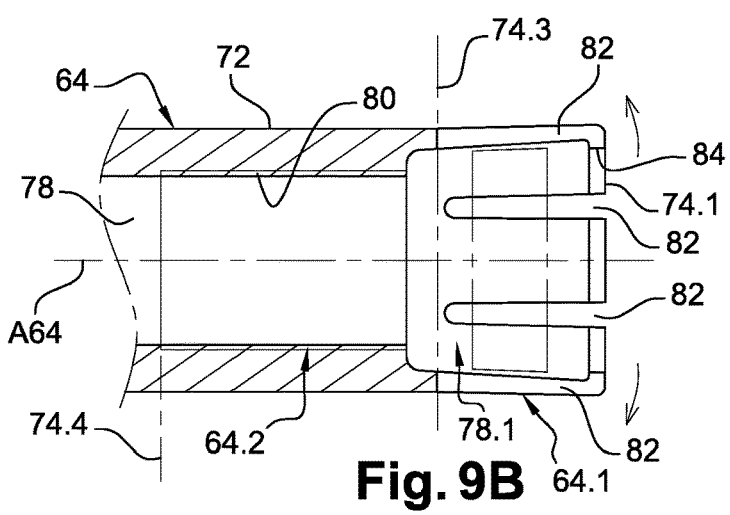
Fig. 9B

PIVOTING CONNECTION DEVICE BETWEEN AT LEAST TWO COMPONENTS, AIRCRAFT COMPRISING A COWL PROVIDED WITH SAID PIVOTING CONNECTION DEVICE

CROSS-REFERENCES TO RELATED APPLICATIONS

This application claims the benefit of the French patent application No. 1854214 filed on May 22, 2018, the entire disclosures of which are incorporated herein by way of reference.

FIELD OF THE INVENTION

The present application relates to a pivoting connection device between at least two components and to an aircraft comprising a cowl which is provided with the pivoting connection device.

BACKGROUND OF THE INVENTION

According to a configuration which can be seen in FIGS. 1 and 2, an aircraft 10 comprises a plurality of engine assemblies 12 which are positioned under the wing unit 14 of the aircraft 10.

An engine assembly 12 comprises an engine 16, a pod 18 which is positioned around the engine 16 and a strut 20 which ensures the connection between the engine 16 and the remainder of the aircraft 10, in particular the wing unit 14.

The pod 18 comprises at least one cowl 22 which is connected to the remainder of the pod 18 by a hinge 24 which allows the cowl 22 to pivot about a pivoting axis A24 between an open position (visible in FIG. 2) and a closed position (visible in FIG. 1).

According to a configuration, the hinge 24 has a plurality of pivoting connection devices 26 which are distributed along the pivoting axis A24.

According to a first embodiment, which can be seen in FIG. 3, a pivoting connection device 26 comprises:

an end fitting 28 which is fixedly joined to the cowl 22 (or to the remainder of the pod 18, respectively) and which has two branches 28.1, 28.2, an arm 30 which is fixedly joined to the remainder of the pod 18 (or the cowl 22, respectively) and which is positioned between the branches 28.1, 28.2 of the end fitting 28, a cylindrical axle 32 which is positioned in coaxial holes which are provided in the two branches 28.1, 28.2 of the end fitting 28 and the arm 30, said cylindrical axle 32 ensuring the connection between the end fitting 28 and the arm 30 and having a revolution axis which is aligned with the pivoting axis A24.

Guiding rings can be interposed between the cylindrical axle 32 and the branches 28.1, 28.2 of the end fitting 28 and between the cylindrical axle 32 and the arm 30.

The pivoting connection device 26 also comprises first and second stops 34, 36, which are positioned either side of the branches 28.1, 28.2 of the end fitting 28, in order to fix the cylindrical axle 32 in terms of translational movement in relation to the branches 28.1, 28.2 in a direction parallel with the pivoting axis A24.

According to this first embodiment, the cylindrical axle 32 has at a first end a head 38 which forms the first stop 34 and which is configured to abut against the outer face F28.1 of the first branch 28.1 of the end fitting 28.

The second stop 36 is in the form of a split pin 40 which extends through the cylindrical axle 32 and which is configured to abut against the outer face F28.2 of the second branch 28.2 of the end fitting 28.

This first embodiment requires that the two sides of the end fitting 28 be accessible in order to be able to assemble the pivoting connection device, the cylindrical axle 32 being introduced from a first side of the end fitting 28, the split pin being positioned from a second side of the end fitting 28.

According to a second embodiment which is described by the document FR-2.947.592 and which is illustrated by FIGS. 4 to 6, a pivoting connection device comprises in addition to the end fitting 28 and the arm 30 a connection system comprising:

a tubular member 42 which has at a first end a collar 42.1 which is configured to abut against the outer face F28.1 of the first branch 28.1 of the end fitting 28 and at a second end at least one slot 42.2 which allows the second end of the tubular member 42 to expand radially, a frustoconical insert 44 which is positioned inside the tubular member 42 in the region of the second end thereof and which has a tapped hole 44.1 and a screw 46 which is configured to be received in the tubular member 42 and which has at a first end a head 46.1 which is configured to be placed against the collar 42.1 of the tubular member 42 and at a second end a threaded portion 46.2 which is configured to be screwed into the tapped hole 44.1.

The screwing or unscrewing of the screw 46 brings about the approach or movement apart of the insert 44 and the head 46.1 of the screw 46. When the insert 44 and the head 46.1 of the screw 46 are in the spaced-apart state, the second end of the tubular member 42 is not expanded radially. When the insert 44 and the head 46.1 of the screw 46 are in the approached state, the second end of the tubular member 42 is radially expanded.

According to this second embodiment, the insert 44 and the head 46.1 of the screw 46 being in the spaced-apart state, the connection system is inserted in the holes of the branches 28.1, 28.2 of the end fitting 28 and the arm 30 from a first side of the end fitting 28. When the connection system is inserted, the head 46.1 of the screw 46 and the insert 44 are moved together by screwing the screw 46 from the first side of the end fitting 28 so as to bring about the expansion of the second end of the tubular member 42.

Thus, according to this second embodiment, the collar 42.1 of the tubular member 42 forms a first stop which allows the tubular member 42 to be fixed in a first direction. The expansion of the second end of the tubular member forms a second stop which allows the tubular member 42 to be fixed. The friction between the tubular member 42 and the second branch 28.2 of the end fitting 28, as a result of the radial expansion of the second end of the tubular member, also contribute to fixing the tubular member 42 in relation to the second branch 28.2.

This second embodiment allows assembly of the pivoting connection device from a single side of the end fitting 28.

However, the presence of a screw 46 which extends over the entire length of the tubular member increases the mass of the pivoting connection device.

SUMMARY OF THE INVENTION

An object of the present invention is to overcome the disadvantages of the prior art.

To this end, the invention relates to a pivoting connection device which connects at least two components, and which comprises:

an end fitting which is fixedly joined to the first component and which has first and second branches which each comprise an inner face which is orientated towards the other branch and an outer face which is opposite the inner face and a hole which opens in the region of the inner and outer faces, an arm which is fixedly joined to the remainder of the second component and which is positioned between the first and second branches of the end fitting and which comprises a hole, a cylindrical axle which is configured to be received in the holes of the first and second branches and the arm, forming a pivoting axis, having a hole which opens at least in the region of a first end face of the cylindrical axle, a first portion of the cylindrical axle which is configured to expand radially and which comprises a first portion of the hole and which extends between the first end face and a first transverse plane, the first portion of the cylindrical axle having in the non-deformed state an outer diameter which is substantially equal to or less than the inner diameter of the holes in which it is received and, in the deformed state, an outer diameter which is greater than the inner diameter of at least one of the holes in which it is received.

According to the invention, the pivoting connection device comprises:

a cylindrical rod which extends between first and second ends and which has a first end portion which is at least partially threaded from the first end and which is configured to be screwed into a tapped portion of a second portion of the hole of the cylindrical axle and a second end portion which is at least partially threaded from the second end, a nut which is configured to be screwed on the second threaded end portion of the cylindrical rod and an insert which is configured to be fitted on the cylindrical rod between the nut and the first end of the cylindrical rod, the insert and the first portion of the hole having such shapes that, when the insert occupies a first position, the first portion of the cylindrical axle is in the non-deformed state and, when the insert occupies a second position, urged by the nut, the first portion of the cylindrical axle is in the deformed state.

As for the second embodiment of the prior art, the pivoting connection device can be assembled from a single side of the end fitting. Thus, the outer face of one of the two branches of the end fitting may be inaccessible.

Unlike the second embodiment, however, no cylindrical rod extends over the entire length of the cylindrical axle, which allows a reduction in the mass of the pivoting connection device.

According to a configuration, the insert has a first end face, a second end face, a through-hole which connects the first and second end faces and a frustoconical outer surface which connects the first and second end faces and which has a diameter which increases from the first end face as far as the second end face, the first and second end faces being orientated towards the first and second ends of the cylindrical rod during operation, respectively. In parallel, the first portion of the hole of the cylindrical axle has a cross section which increases from the first transverse plane as far as the first end face.

According to a configuration, the frustoconical outer surface of the insert has an inclination identical to the inclination of the first portion of the hole.

According to another feature, the pivoting connection device comprises a ring which is interposed between the insert and the nut, said ring being configured to ensure the transmission of the forces from the nut to the insert and to allow the nut to pivot without pivoting the insert.

According to another feature, the cylindrical axle has an inner collar which is positioned in the region of the first end face.

According to another feature, the cylindrical rod has an outer collar which separates the first end portion and the second end portion.

According to another feature, the cylindrical rod has a rotation prevention system which is configured to allow the cylindrical rod to be fixed in terms of rotation during the screwing of the nut.

According to a first embodiment, the rotation prevention system has a head which is positioned in the region of the second end of the cylindrical rod and which is configured to cooperate with a wrench which is used to fix the cylindrical rod in terms of rotation.

According to a second embodiment, the rotation prevention system has a recessed impression which is positioned on the second end of the cylindrical rod and which is configured to cooperate with a wrench which is used to fix the cylindrical rod in terms of rotation.

The invention also relates to an aircraft which comprises a cowl which is provided with at least one pivoting connection device according to one of the preceding features.

BRIEF DESCRIPTION OF THE DRAWINGS

Other features and advantages will be appreciated from the following description of the invention which description is given merely by way of example with reference to the appended drawings, in which:

FIG. 7 is a longitudinal section of a pivoting connection device which illustrates a first embodiment of the invention, FIG. 8 is a section of a portion of the pivoting connection device which can be seen in FIG. 7, FIGS. 9A and 9B are sections of a portion of a cylindrical axle of the pivoting connection device which can be seen in FIG. 7 in the non-deformed state and in the deformed state, respectively, FIG. 10 is a section of an insert of the pivoting connection device which can be seen in FIG. 7, FIGS. 11A to 11E are perspective views which illustrate steps of an assembly method for the pivoting connection device which can be seen in FIG. 7.

DETAILED DESCRIPTION OF THE PREFERRED EMBODIMENTS

Figure 1:
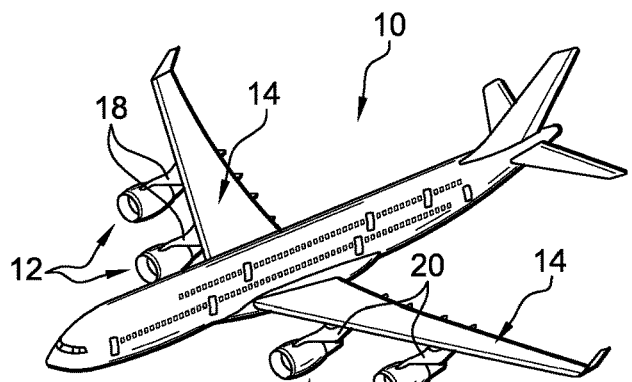
FIG. 1 is a perspective view of an aircraft.
Figure 2:
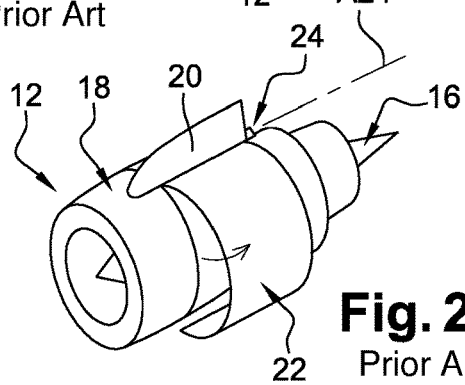
FIG. 2 is a perspective view of an aircraft engine assembly.
Figure 3:
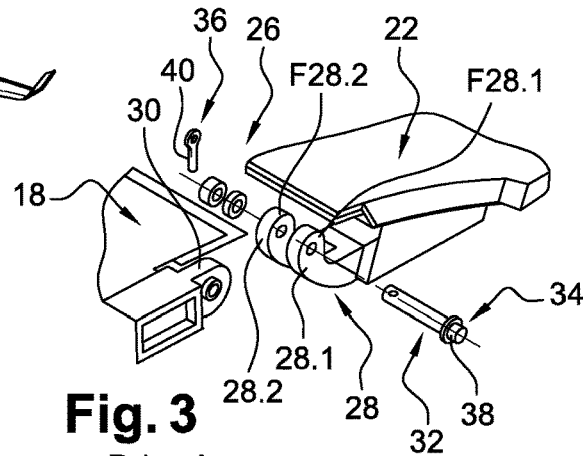
FIG. 3 is a perspective view of a pivoting connection device which illustrates a first embodiment of the prior art, in the disassembled state.
Figure 4:
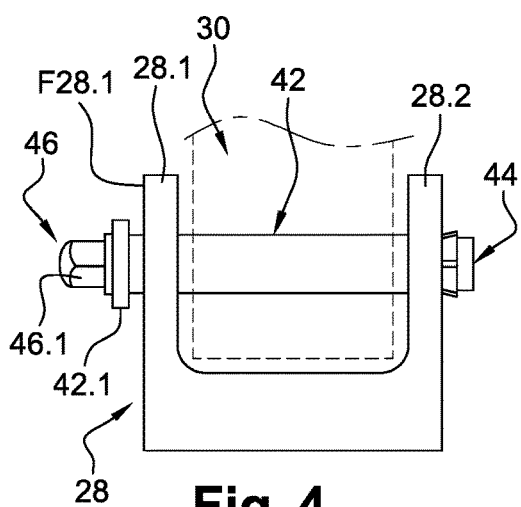
FIG. 4 is a side view of a pivoting connection device which illustrates a second embodiment of the prior art.
Figure 5:
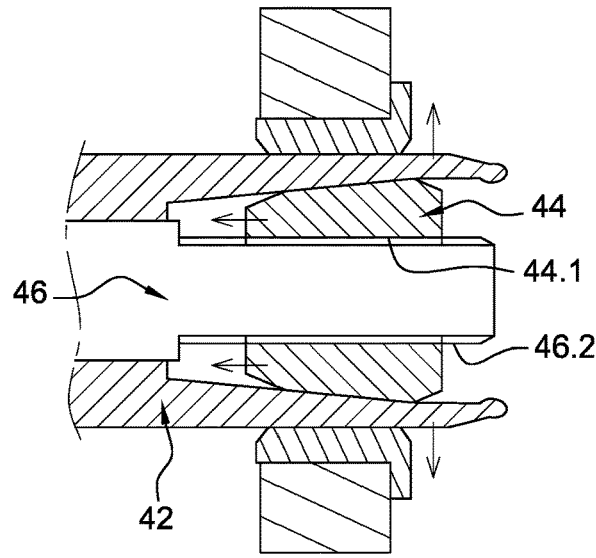
FIG. 5 is a longitudinal section of a portion of the pivoting connection device which can be seen in FIG. 4.
Figure 6:
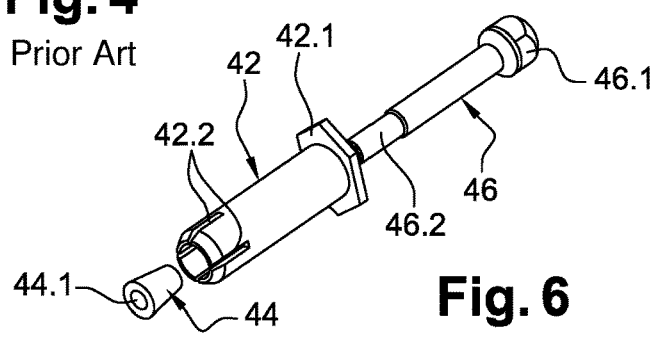
FIG. 6 is a perspective view of a portion of the pivoting connection device which can be seen in FIG. 4, in the disassembled state.

FIG. 7 illustrates a pivoting connection device 50 which connects at least first and second components 52 and 54. According to one application, the first component 52 is a cowl of an aircraft pod and the second component 54 is an aircraft pod.

The pivoting connection device 50 comprises:

an end fitting 56 which is fixedly joined to the first component 52 and which has first and second branches 58, 60, an arm 62 which is fixedly joined to the remainder of the second component 54 and which is positioned between the first and second branches 58, 60 of the end fitting 56, a cylindrical axle 64 which connects the arm 62 and the end fitting 56, forming a pivoting axis A64.

For the rest of the description, a longitudinal direction is a direction parallel with the pivoting axis A64. A radial direction is perpendicular to the pivoting axis A64. A longitudinal plane is a plane which extends through the pivoting axis A64. A transverse plane is a plane perpendicular to the pivoting axis A64.

According to a configuration, each branch 58 (or 60) comprises an inner face FI58 (or FI60) which is orientated towards the other branch 60 (or 58) and an outer face FE58 (or FE60) which is opposite the inner face FI58 (or FI60). The inner faces FI58, FI60 and the outer faces FE58, FE60 are mutually parallel and positioned in transverse planes.

Each branch 58 (or 60) comprises a hole 66 (or 68) which opens in the region of the inner face FI58 (or FI60) and the outer face FE58 (or FE60), the hole 66 (or 68) having a revolution axis which is perpendicular to the inner face FI58 (or FI60) and the outer face FE58 (or FE60).

The arm 62 comprises two side faces F62, F62' which are mutually parallel, and which are perpendicular to the pivoting axis A64 and a hole 70 which opens in the region of the side faces F62, F62', the hole 70 having a revolution axis which is perpendicular to the side faces F62, F62' and which corresponds to the pivoting axis A64.

The cylindrical axle 64 has a cylindrical peripheral face 72 which is coaxial with the pivoting axis A64 which extends between first and second end faces 74.1, 74.2 which are substantially perpendicular to the pivoting axis A64.

The pivoting connection device 50 may comprise at least one guiding ring 76 which is interposed between one of the branches 58 and the cylindrical axle 64.

According to a configuration, the holes 66 to 70 of the first and second branches 58, 60 and the arm 62 comprise guiding rings. According to a configuration, only the holes 66, 68 of the first and second branches 58, 60 comprise guiding rings.

Regardless of which embodiment is involved, the cylindrical axle 64 is configured to be received in holes which are fixedly joined to the branches 58, 60 and the arm 62.

The cylindrical axle 64 is a hollow tube which has a hole 78 which is coaxial with the peripheral face 72 of the cylindrical axle 64 and which opens at least in the region of the first end face 74.1. According to a configuration, the hole 78 extends between the first and second end faces 74.1 and 74.2.

According to an embodiment, the cylindrical axle 64 comprises:

a first portion 64.1 which comprises a first portion 78.1 of the hole 78 and which is configured to expand radially, and which extends between the first end face 74.1 and a first transverse plane 74.3, a second portion 64.2 which comprises a second portion 78.2 of the hole 78 which has a tapped portion 80 and which extends between the first transverse plane 74.3 and a second transverse plane 74.4, and a third portion 64.3 which comprises a third portion 78.3 of the hole 78 and which extends between the second transverse plane 74.4 and the second end face 74.2.

According to another embodiment, only the first and second portions 64.1 and 64.2 are hollow, the third portion 64.3 being solid.

The cylindrical axle 64 is configured so that once it is assembled the first end face 74.1 is in the region of the outer face FE58 of the first branch 58 or is slightly projecting in relation to the outer face FE58 of the first branch 58, the second end face 74.2 projecting relative to the outer face FE60 of the second branch 60 and the first transverse plane 74.3 being arranged approximately in the same plane as the inner face FI58 of the first branch 58.

In order to allow the radial expansion thereof, the first portion 64.1 comprises at least one slot 82 which extends from the first end face 74.1 in the direction of the first transverse plane 74.3. According to a configuration which can be seen in FIGS. 9A and 9B, the first portion 64.1 comprises six slots 82. Each slot 82 is approximately parallel with the pivoting axis A64.

In order to facilitate the radial expansion thereof, the first portion 64.1 has a thickness less than the thickness of the second portion 64.2.

According to a configuration which can be seen in detail in FIGS. 9A and 9B, the first portion 78.1 of the hole 78 widens slightly from the first transverse plane 74.3 as far as the first end face 74.1. Thus, the first portion 78.1 of the hole 78 has a maximum diameter Dmax, in the region of the first end face 74.1 or near the first end face 74.1, and a minimum diameter Dmin in the region of the first transverse plane 74.3 or near the first transverse plane 74.3.

According to a configuration, the cylindrical axle 64 has an inner collar 84 which is positioned in the region of the first end face 74.1. This inner collar 84 is separated by the slots 82 and has a height (dimension taken in a direction perpendicular to the pivoting axis A64) in the order of from 1 to 3 mm.

During operation, the first portion 64.1 has, in the non-deformed state, an outer diameter which is substantially equal to or less than the inner diameter of the guiding ring 76 in the presence of a guiding ring 76 or the diameter of the hole 66 if the guiding ring is omitted and, in the deformed state, an outer diameter greater than the inner diameter of the guiding ring 76 in the presence of a guiding ring 76 or the diameter of the hole 66 if the guiding ring is omitted.

Regardless of which embodiment is involved, the first portion 64.1 has, in the non-deformed state, an outer diameter which is substantially equal to or less than the inner diameter of the holes in which it is received and, in the deformed state, an outer diameter greater than the inner diameter of at least one of the holes in which it is received.

The pivoting connection device 50 comprises in addition to the cylindrical axle 64:

a cylindrical rod 86 which extends between first and second ends 86.1 and 86.2 and which has a first end portion 88.1, which is at least partially threaded from the first end 86.1 and configured to be screwed into the tapped portion 80 of the second portion 78.2 of the hole 78, and a second end portion 88.2 which is at least partially threaded from the second end 88.2, an insert 90 which is configured to be fitted on the cylindrical rod 86, and a nut 92 which is configured to be screwed on the second threaded end portion 88.2 of the cylindrical rod 86.

According to a configuration which can be seen in FIG. 10, the insert 90 has a first end face 90.1, a second end face 90.2 and a through-hole 94 which connects the first and second end faces 90.1 and 90.2. The insert 90 has a frustoconical outer surface 96 which connects the first and second end faces 90.1 and 90.2 and which has a diameter which increases from the first end face 90.1 as far as the second end face 90.2. During operation, when the pivoting connection device is assembled, the first and second end faces 90.1 and 90.2 are orientated towards the first and second ends 86.1 and 86.2 of the cylindrical rod 86, respectively. These two end faces 90.1 and 90.2 have to be positioned between the inner and outer faces FI58 and FE58.

The first end face 90.1 has a diameter slightly less than or equal to the inner diameter of the hole 78 in line with the inner collar 84. This configuration allows the possibility of inserting the insert 90 in the hole 78 of the cylindrical axle 64.

The insert 90 has at least one outer diameter, in particular in the region of the second end face 90.2, which is greater than the inner diameter of at least a portion of the first portion 78.1 of the hole 78 when the first portion 64.1 of the cylindrical axle 64 is not deformed.

The insert 90 and the first portion 78.1 of the hole 78 have such shapes that, when the insert 90 occupies a first position, near the first end face 74.1, as illustrated in FIG. 9A, the first portion 64.1 of the cylindrical axle 64 is in the non-deformed state and, when the insert 90 occupies a second position, further away from the first end face 74.1, as illustrated in FIG. 9B, the first portion 64.1 of the cylindrical axle 64 is in the deformed state and has an outer diameter greater than the inner diameter of the hole in which it is received. When the nut 92 is screwed, it urges the insert 90 from the first position towards the second position.

According to a configuration, the frustoconical outer surface 96 has an inclination identical to the inclination of the first portion 78.1 of the hole 78. Thus, there is obtained surface contact between the insert 90 and the first portion 64.1 of the cylindrical axle 64.

The cylindrical rod 86 has a rotation prevention system which is configured to allow the cylindrical rod 86 to be fixed in terms of rotation during the screwing of the nut 92.

According to a first embodiment which is illustrated in FIGS. 7, 8, 11A to 11E, the rotation prevention system has a head 98 which is positioned in the region of the second end 86.2 of the cylindrical rod 86 and which is, for example, hexagonal and which is configured to cooperate with a wrench which is used to fix the cylindrical rod 86 in terms of rotation. According to this first embodiment, the cylindrical rod 86 is a portion of a screw.

Figure 13:
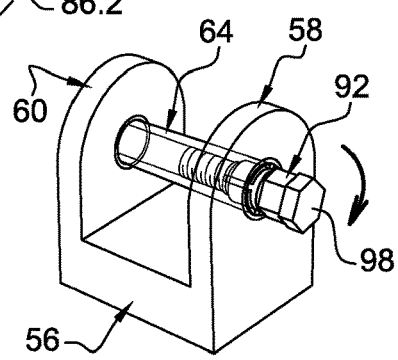
FIG. 13 is a perspective view of the cylindrical rod of the pivoting connection device which can be seen in FIG. 12.
Figure 12:
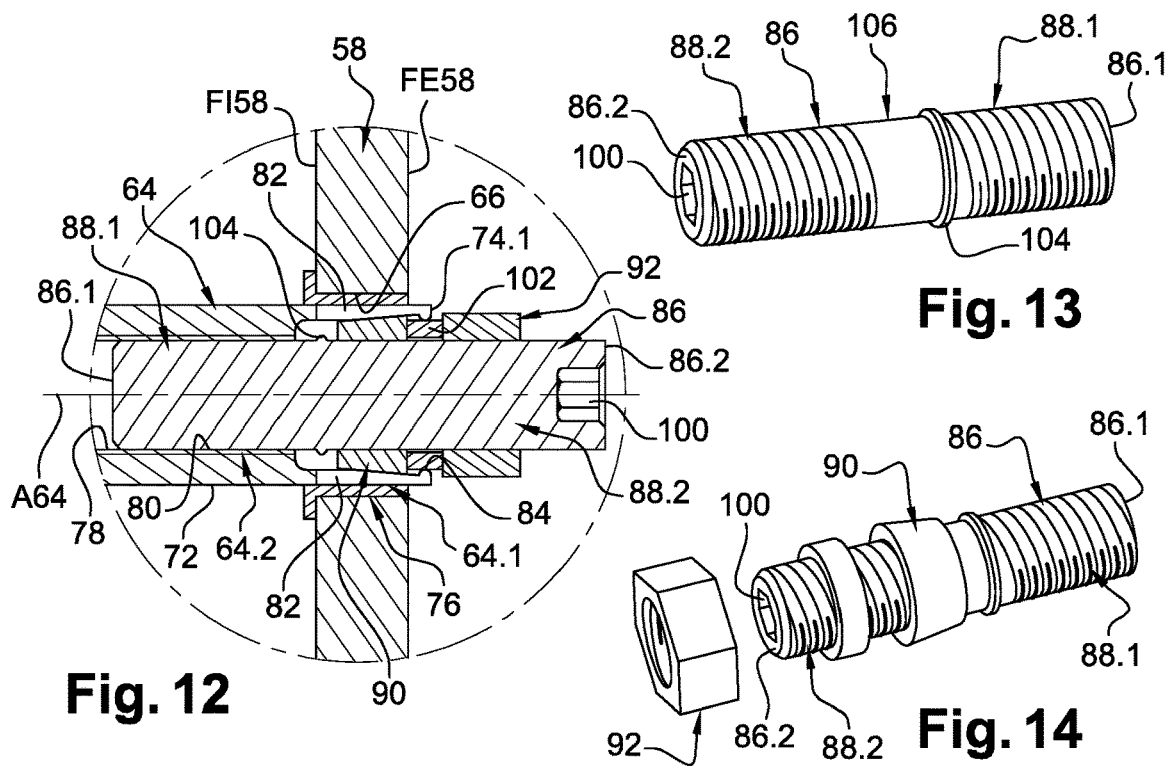
FIG. 12 is a section of a portion of a pivoting connection device which illustrates a second embodiment of the invention.
Figure 14:
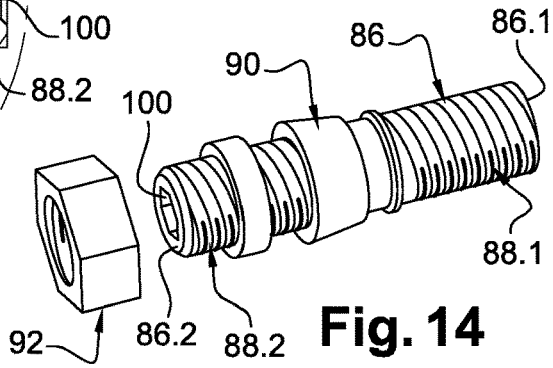
FIG. 14 is a perspective view which illustrates a step of an assembly method for the pivoting connection device which can be seen in FIG. 12.

According to a second embodiment which is illustrated in FIGS. 12 to 14, the rotation prevention system has a hollow impression 100 which is positioned on the second end 86.2 of the cylindrical rod 86 and which is, for example, hexagonal and which is configured to cooperate with a wrench which is used to fix the cylindrical rod 86 in terms of rotation. According to this second embodiment, the cylindrical rod 86 is a portion of a pin.

According to another feature, the pivoting connection device 50 comprises a ring 102 which is interposed between the insert 90 and the nut 92. This ring 102 is configured to ensure the transmission of the forces from the nut 92 to the insert 90 and to allow the nut 92 to pivot without pivoting the insert 90.

This ring 102 has an outer diameter which is less than that of the second end face 90.2 of the insert 90. During operation, the ring 102 is positioned in the region of the inner collar 84 of the cylindrical axle 64, the ring 102 and the inner collar 84 being configured so that the inner collar 84 abuts against the ring 102 and fixes it in terms of rotation.

According to a configuration, the cylindrical rod 86 has an outer collar 104 which separates the first end portion 88.1 and the second end portion 88.2. During operation, the outer collar 104 is positioned in the region of the inner face FI58 of the first branch 58. This outer collar 104 is used to disassemble the insert 90 and to withdraw it from the hole 78 by unscrewing the cylindrical rod 86. Furthermore, during operation, the inner and outer collars 84 and 104 limit the risks of unscrewing.

According to the first embodiment illustrated in FIGS. 7, 8, 11A to 11E, the cylindrical rod 86 is threaded from the first end 86.1 as far as the head 98. The outer collar 104 is formed only after the positioning of the nut 92, the ring 102 and the insert 90 by adding material, such as, for example, by welding.

According to the second embodiment which is illustrated in FIGS. 12 to 14, the cylindrical rod has the outer collar 104 as soon as it is produced. The nut 92, the ring 102 and the insert 90 are positioned on the cylindrical rod 86 from the second end 86.2. The first end portion 88.1 is threaded over the entire length thereof from the first end 86.1 as far as the outer collar 104. The second end portion 88.2 is threaded only over a portion of the length thereof from the second end 86.2. It has a smooth portion 106 which adjoins the outer collar 104, the insert 90 being positioned in the region of this smooth portion 106 during operation.

The assembly method of the pivoting connection device according to the first embodiment is described with reference to FIGS. 11A to 11E.

Initially, the insert 90, the nut 92 and the optional ring 102 are positioned on the cylindrical rod 86.

Figure 11A:
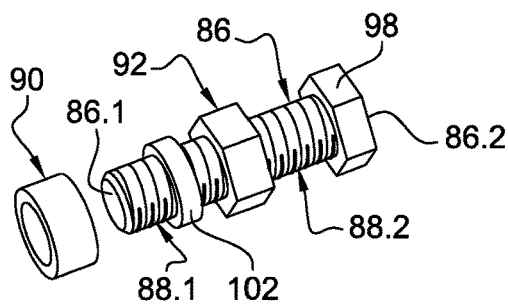
Figure 11B:
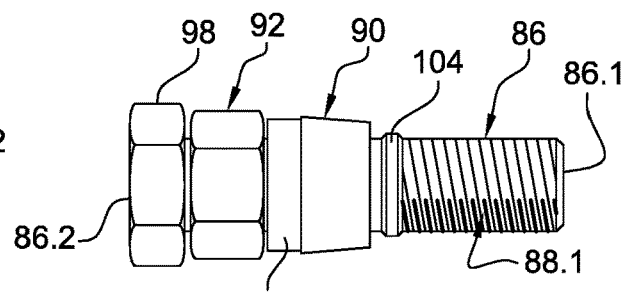

As illustrated in FIG. 11A, the nut 92 is screwed on the cylindrical rod from the first end 86.1 thereof until it comes into contact or virtually into contact with the head 98. Subsequently, the ring 102 then the insert 90 are fitted on the cylindrical rod 86 from the first end 86.1 and are positioned in the region of the second end portion 88.2. Then, the outer collar 104 is formed, as illustrated in FIG. 11B.

Figure 11C:
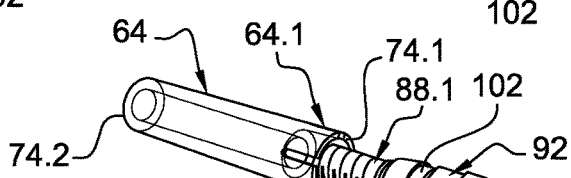

The first portion 88.1 of the cylindrical rod 86 is inserted in the hole 78 of the cylindrical axle 64 then screwed into the tapped portion 80 of the second portion 78.2 of the hole 78, as illustrated in FIG. 11C. During the screwing of the first portion 88.1 of the cylindrical rod 86 into the tapped portion 80, the insert 90 passes the inner collar 84. At the end of the screwing action, the insert 90 is positioned inside the first portion 78.1 of the hole 78, near the first end face 74.1, as illustrated in FIG. 9A.

Figures 11D, 11E:
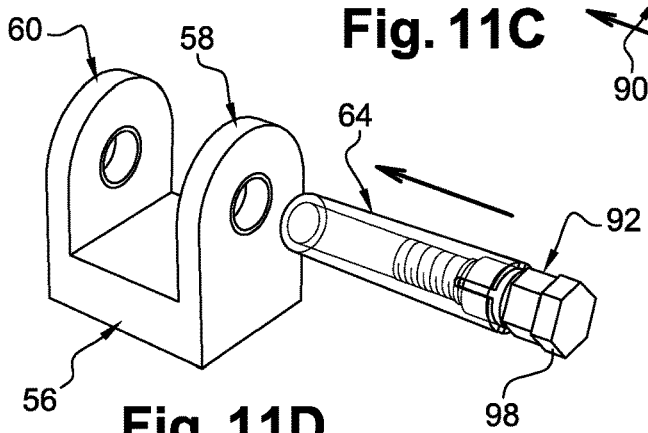

Subsequently, as illustrated in FIG. 11D, the assembly formed by the cylindrical axle 64, the cylindrical rod 86 which is provided with the insert 90, the ring 102 and the nut 92 is positioned inside the holes 66 to 70 of the branches 58, 60 of the end fitting 56 and the arm 62.

When the cylindrical axle 64 is correctly positioned, as illustrated in FIG. 11E, the nut 92 is screwed while retaining the cylindrical rod 86 in terms of rotation so as to move apart the insert 90 from the first end face 74.1 and to bring about the radial expansion of the first portion 64.1 of the cylindrical axle 64, as illustrated in FIG. 9A. This radial expansion of the first portion 64.1 of the cylindrical axle 64 brings about fixing by means of friction of the cylindrical axle 64 in relation to the first branch 58 or in relation to the guiding ring 76 if it is present.

The assembly method of the second embodiment is substantially identical. Only the assembly of the insert 90, the ring 102 and the nut 92 is different. As illustrated in FIG. 14, the insert 90 and the ring 102 are fitted on the cylindrical rod 86 from the second end 86.2, then the nut 92 is screwed on the cylindrical rod 86 from the second end 86.2.

According to the invention, the pivoting connection device can be assembled from a single side of the end fitting 56. Thus, the outer face FE60 of the second branch 60 may be inaccessible.

Furthermore, the fact that no cylindrical rod extends over the entire length of the cylindrical axle 64 allows a reduction in the mass of the pivoting connection device.

When the outer face FE60 of the second branch 60 is accessible, the cylindrical axle 64 may have ends 64.1 and 64.2 which are identical and the connection device may be symmetrical for the two branches 58 and 60 and may have a first cylindrical rod 86, a first insert and a first nut which are positioned at a first end of the cylindrical axle 64 and a second cylindrical rod 86, a second insert and a second nut which are positioned at a second end of the cylindrical axle 64.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pivoting connection device connecting at least a first component and a second component, and comprising:
   an end fitting fixedly joined to the first component and having first and second branches each comprising an inner face orientated towards the other branch and an outer face opposite the inner face, the first and second branches each comprising an end fitting hole opening in the inner and outer faces,
   an arm fixedly joined to a remainder of the second component and being positioned between the first and second branches of the end fitting and comprising an arm hole,
   a cylindrical axle configured to be received in the end fitting holes and the arm hole, the cylindrical axle fixedly joined to the first and second branches and the arm, forming a pivoting axis and having a cylindrical axle hole opening at least in a region of a first end face of the cylindrical axle,
   a first portion of the cylindrical axle configured to expand radially including a first portion of the cylindrical axle hole and extending between the first end face and a first transverse plane, the first portion having in a non-deformed state an outer diameter substantially equal to or less than an inner diameter of the end fitting holes and the arm hole in which the cylindrical axle is received and, in a deformed state, an outer diameter greater than the inner diameter of at least one of the end fitting holes and the arm hole in which the cylindrical axle is received,
   a cylindrical rod extending between first and second ends and having a first end portion at least partially threaded from the first end and configured to be screwed into a tapped portion of a second portion of the cylindrical axle hole and a second end portion at least partially threaded from the second end,
   a nut configured to be screwed on the second threaded end portion of the cylindrical rod, and
   an insert configured to be fitted on the cylindrical rod between the nut and the first end of the cylindrical rod, the insert and the first portion of the cylindrical axle hole having such shapes that, when the insert occupies a first position, the first portion of the cylindrical axle is in the non-deformed state and, when the insert occupies a second position, urged by the nut, the first portion of the cylindrical axle is in the deformed state.

2. The pivoting connection device according to claim 1, wherein the insert has a first end face, a second end face, a through-hole connecting the first and second end faces and a frustoconical outer surface connecting the first and second end faces and having a diameter increasing from the first end face as far as the second end face, the first and second end faces being orientated towards the first and second ends of the cylindrical rod during operation, respectively, and wherein the first portion of the cylindrical axle hole has a cross section increasing from the first transverse plane as far as the first end face.

3. The pivoting connection device according to claim 2, wherein the frustoconical outer surface of the insert has an inclination identical to an inclination of the first portion of the cylindrical axle hole.

4. The pivoting connection device according to claim 1, wherein the pivoting connection device comprises a ring interposed between the insert and the nut, said ring being configured to ensure a transmission of the forces from the nut to the insert and to allow the nut to pivot without pivoting the insert.

5. The pivoting connection device according to claim 1, wherein the cylindrical axle has an inner collar positioned in the region of the first end face.

6. The pivoting connection device according to claim 1, wherein the cylindrical rod has an outer collar separating the first end portion and the second end portion.

7. The pivoting connection device according to claim 1, wherein the cylindrical rod has a rotation prevention system configured to allow the cylindrical rod to be fixed in terms of rotation during the screwing of the nut.

8. The pivoting connection device according to claim 7, wherein the rotation prevention system has a head positioned in the region of the second end of the cylindrical rod and configured to cooperate with a wrench which is used to fix the cylindrical rod in terms of rotation.

9. The pivoting connection device according to claim 7, wherein the rotation prevention system has a recessed impression positioned on the second end of the cylindrical rod and configured to cooperate with a wrench used to fix the cylindrical rod in terms of rotation.

10. An aircraft comprising a cowl provided with at least one pivoting connection device according to claim 1.

\* \* \* \* \*